UNITED STATES PATENT OFFICE.

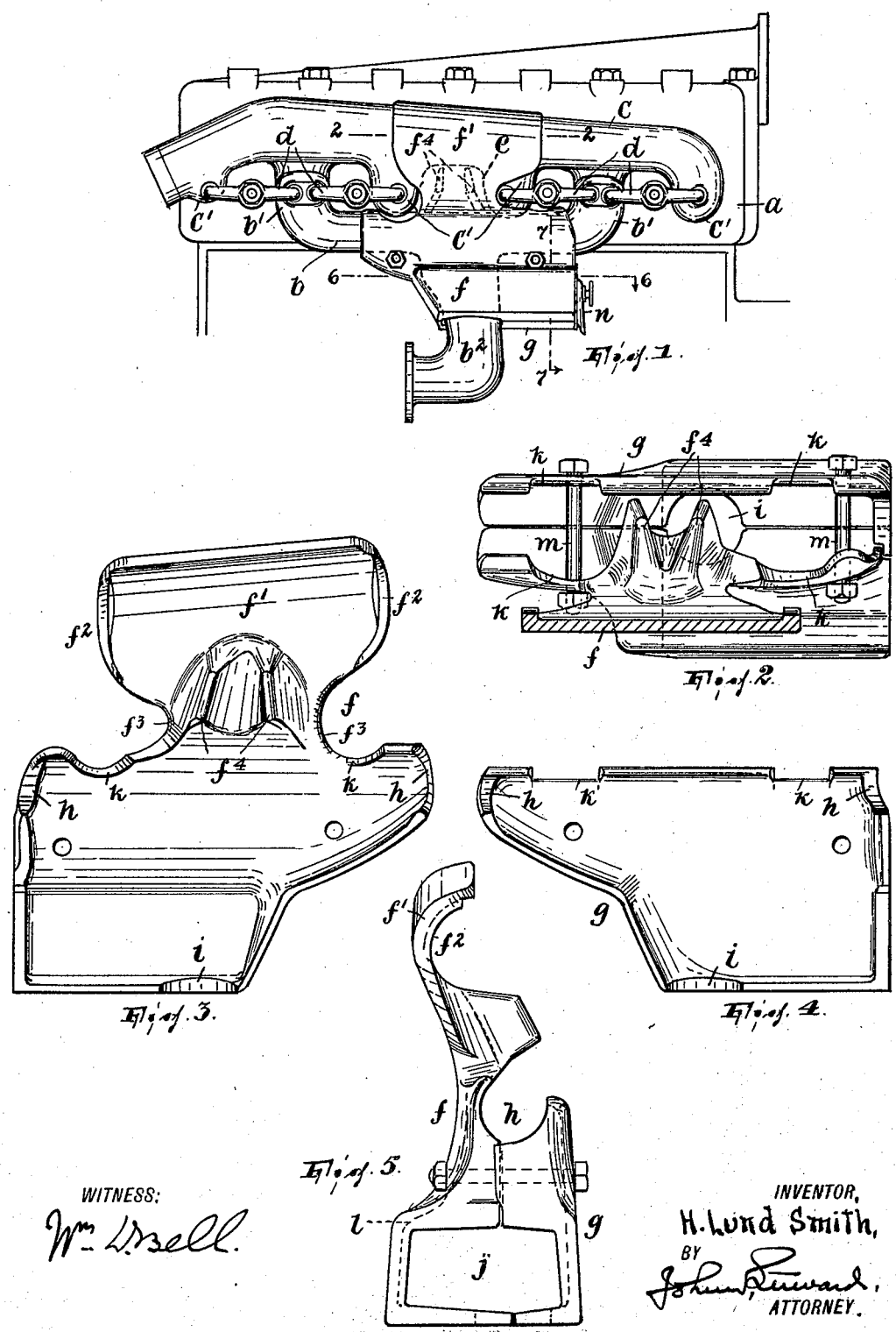

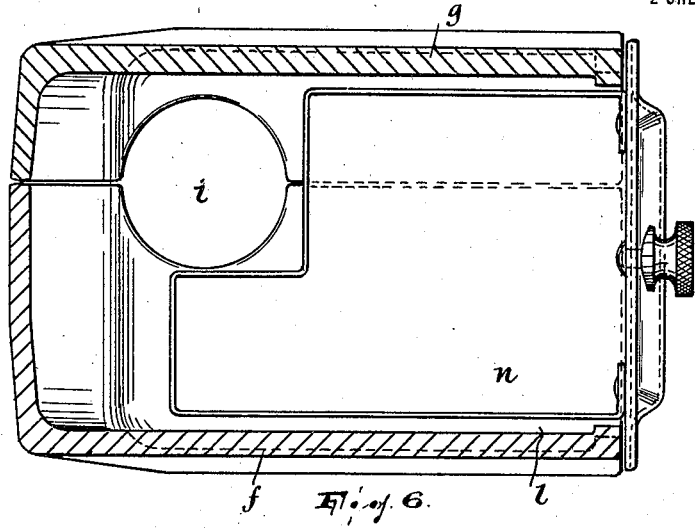
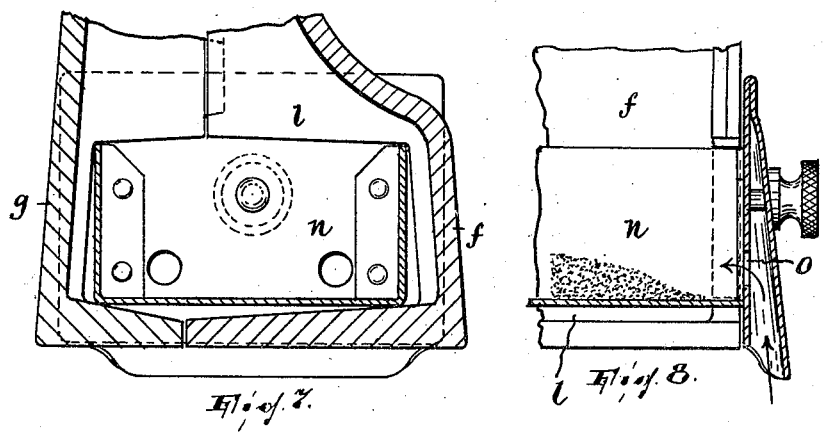

HENRY LUND SMITH, OF PATERSON, NEW JERSEY.

DEVICE FOR HEATING THE INTAKE MANIFOLDS OF INTERNAL-COMBUSTION ENGINES.

1,386,904.

Specification of Letters Patent. Patented Aug. 9, 1921.

Application filed February 5, 1920. Serial No. 356,549.

*To all whom it may concern:*

Be it known that I, HENRY LUND SMITH, a citizen of the United States, residing at Paterson, in the county of Passaic and State of New Jersey, have invented certain new and useful Improvements in Devices for Heating the Intake Manifolds of Internal-Combustion Engines, of which the following is a specification.

This invention relates to means for heating the explosive charge for an internal combustion engine before the charge is introduced into the cylinders. The principal object is to provide an efficient attachment for engines of the Ford automobile type, where the exhaust and intake manifolds are arranged at the same side of the engine, whereby the fuel mixture in the intake manifold may be heated from the exhaust manifold. A further object is to provide in such an attachment means whereby the fuel mixture in the intake manifold may be heated when heat from the exhaust manifold is not available for the purpose. In the Ford engine the manifolds are so formed and arranged as together and with the side of the engine to form a pocket directly over the inlet to the intake manifold, and my invention contemplates utilizing this pocket for concentrating heat on the part of the intake manifold where the fuel mixture enters the latter and then becomes distributed to the cylinders.

In the drawings,

Figure 1 is a side elevation of a Ford automobile engine provided with my attachment;

Fig. 2 is a sectional view of the attachment on the line 2—2, Fig. 1;

Fig. 3 is an inside elevation of the outer section of the attachment;

Fig. 4 is an inside elevation of the inner section;

Fig. 5 is an end elevation of the attachment with the drawer $n$ removed;

Fig. 6 is a sectional view on the line 6—6, Fig. 1;

Fig. 7 is a sectional view on the line 7—7, Fig. 1; and,

Fig. 8 is a sectional fragmentary detail of the drawer.

$a$ is the side of the engine. $b$ is the intake manifold having its ends upturned at $b'$ and attached to the engine side and having its inlet portion $b^2$ projecting upwardly thereto and arranged about midway its length. $c$ is the exhaust manifold having the usual downward projections $c'$ arranged at intervals along the same and forming inlets thereto from the engine. The two manifolds are secured to the engine side, close thereto, by the clamps $d$ in the usual way.

The two intermediate portions $c'$ of the exhaust manifold stand between the end portions $b'$ of the intake manifold $b$ and form with the latter manifold and with the engine side a pocket $e$. This pocket is directly opposite the inlet $b^2$ of the intake manifold, and I find that it results in a great economy of fuel and consequently in materially increasing the efficiency of the engine if heat be accumulated in this pocket.

For this purpose I provide means to deliver heat into the pocket having a part thereof covering the open side of the pocket, that is, the outer side or the side away from the engine. In the present embodiment this means both acts to conduct heat to the pocket from the manifold, and (as for the purpose of assisting the engine to start by pre-heating the fuel therefor) is formed with a heat space which is in communication with the pocket and may contain a lamp, a powder impregnated with some inflammable material, as gasolene, etc. This means I shall now describe, with reference to that particular embodiment thereof which is shown in the drawings.

A shell is provided, which I conveniently form in two sections (Figs. 3 and 4), one of which $f$ rests against the outer faces of both manifolds and the other of which, $g$, rests against the back of the intake manifold. The section $f$ has at the top a web $f'$ which jackets and is curved to fit more or less closely around the exhaust manifold, preferably having contact therewith at its ribs $f^2$; it is cut away at $f^3$ to clear the clamps $d$ but otherwise it more or less completely covers the pocket $e$. It further has cast thereon the lug or lugs $f^4$, which project into the pocket which taper from broad basal portions to their ends so as to conduct and radiate as much heat as possible. The lower part of section $f$ and the section $g$ are cut away at $h$ to receive the intake manifold, and at $i$ to receive the inlet portion $b^2$ thereof, and also at $j$ and $k$ for purposes to be explained, but otherwise their marginal edges meet fairly closely all around and they thus form below the intake manifold a heat compartment or chamber $l$. The two sections may be clamped in place on the manifolds by the bolts $m$. A metal drawer $n$ to receive powdered asbestos adapted to be impregnated with gasolene may be entered into the compartment; or any other source of heat may be used in its place. The products of combustion from this heat source are allowed to escape by the vents $k$.

When the engine is running the heat from the exhaust products is transmitted to the walls of the exhaust manifold and from there to the web $f'$ and by it and its lug or lugs $f^4$ conducted into the pocket $e$. Heat is thus accumulated in the pocket, in consequence of which the fuel mixture rising through the inlet $b^2$ of the intake manifold becomes heated at the point where it is distributed to the different cylinders. The forming of the lower portion of the shell as a heat chamber is designed primarily for use in starting the engine, as by igniting the inflammable material in the drawer or any equivalent source of heat, so that a heated space will be formed around the intake manifold; and it forms means to deliver heat into the aforesaid pocket by conductivity through its walls to the radiating elements $f^4$ and also otherwise than by conductivity, it being understood that some of the air which enters said chamber at the port $o$ in Figs. 7 and 8 in order to support combustion of the heating source flows up into said pocket.

Having thus fully described my invention, what I claim as new and desire to secure by Letters Patent is:—

In combination, with the engine side and with engine exhaust and intake manifolds arranged the former over the latter and forming together and with said side a pocket, the intake manifold having its inlet delivering upwardly thereinto and beneath said pocket, a heat-conducting jacket member jacketing the exhaust manifold and having a heat-radiating projection extending into said pocket and tapering from a broad base to its free end.

In testimony whereof I affix my signature.

HENRY LUND SMITH.